Jan. 14, 1930.  J. S. DAVIS  1,744,022
POISON CONTAINER
Filed April 23, 1928
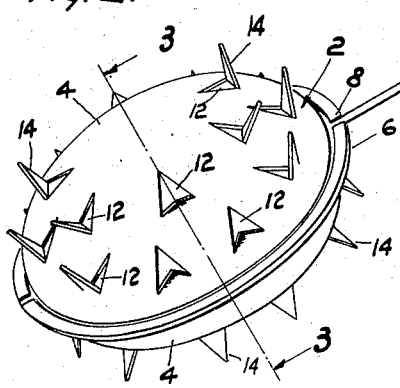
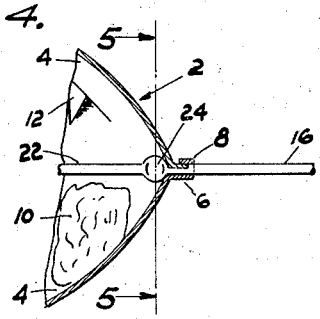
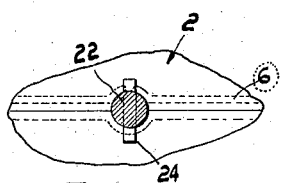
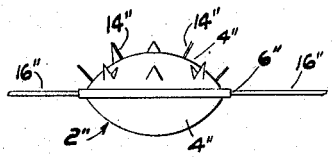
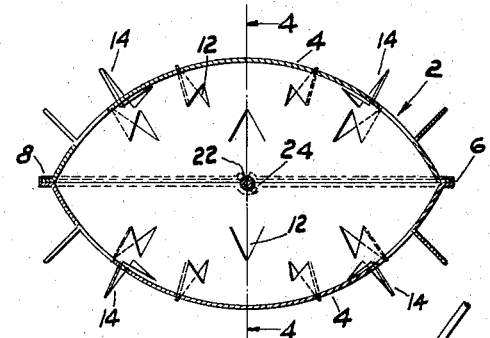
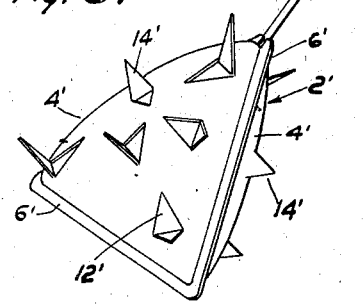
Inventor
JOHN S. DAVIS
by Fred D. Hayn
Attorney.

Patented Jan. 14, 1930

1,744,022

UNITED STATES PATENT OFFICE

JOHN S. DAVIS, OF LOS ANGELES, CALIFORNIA

POISON CONTAINER

Application filed April 23, 1928. Serial No. 272,234.

My invention relates to containers for housing dangerous poisons, and more particularly to such containers, by means of which insects, such as ants, flies, roaches, and similar pests may be allowed easy access to the poisons contained therein and thereby be destroyed, while the said poisons are so securely sealed away that ignorant or irresponsible persons, or children, or domestic animals, cannot obtain this poison, and are, therefore, protected from danger should such poison containers fall into their hands.

It accordingly is an object of my invention to provide a novel form of insecticide or poison container preferably formed of two complementary poison holding portions, sealed together, said portions being provided with openings for the entry of the insects to be exterminated, suitable means, such as prongs, being provided on said portions to prevent careless handling thereof, said portions having also associated therewith a combined safety handling and supporting means, whereby the device may be handled with safety and at the same time securely attached where desired, as on a tree, nail, hook or the like, or elsewhere.

The above and further objects and advantages of my invention, as will hereinafter more fully appear, I attain by the structure described in the specification and illustrated on the drawings forming a part of my application.

Reference is had to the accompanying drawings, in which similar reference characters denote similar parts. In the drawings, Fig. 1 is an elevational view showing one way in which my invention may be put to practical use, Fig. 2 is a perspective view, on an enlarged scale, of one form of my invention, Fig. 3 is an enlarged cross-sectional view, taken on the line 3—3, Fig. 2, Fig. 4 is a fragmentary cross-section corresponding to Fig. 3, but showing a modified base member, Fig. 5 is a similar view taken on the line 5—5, Fig. 4, Fig. 6 is a perspective view of a still further modified form of my invention, and Fig. 7 is a fragmentary end view of a modification in which two wires rather than one are used.

Describing my invention more in detail, the container 2 is composed of a pair of complementary poison housing portions 4, flanged as at 6, said portions being preferably stamped or pressed or otherwise formed from suitable sheet material, the flanges 6 being secured together by the bent over parts 8, as seen more clearly in Fig. 4 or in any other manner in practice preferred.

The poison used for attracting the insects and destroying them may be of liquid form, granular or solid, so that the pests may carry some away to other nests, and if liquid, a suitable sponge or absorbent material 10, to absorb same, as seen in Fig. 4, may be used, in which case one of the complementary portions 4 may be plain.

To permit the entry of the insects suitable holes 12 may be cut from the portions 4, and these holes may be defined by cutting out in any desired manner the prongs or sharpened parts 14, which prongs are intended to prick the hands of children or irresponsible persons or animals so that the device will be quickly dropped insuring the safety of said persons or animals so they will not be poisoned.

To provide a convenient means for handling the device with safety, and also to provide a means for supporting the same as in practice desired, I associate therewith in any manner preferred a handle 16, preferably made of wire or other flexible material so the device may be supported or positioned in any place desired, such as the tree 20, or by sticking said wire in the ground or winding same about a nail and the like. It will of course be understood that it is not necessary that the device be supported, the wire 16 serving also as a convenient means for the safe handling of the device and placing same in position.

It is preferred also that the poison be permanently sealed, as hereinbefore stated, and to prevent dismantling and removal of the handle 16, I permanently associate the same with the container 2, said handle having a portion 22 extending through said container and secured thereto by crimping, forming enlarged parts 24 all of which, if desired, may be fastened together in any way desired, the parts being preferably secured together in one operation.

It will of course be understood that the device or container 2 may take any shape or form in practice suggested, and may be produced as desired, but by reason of the ease, cheapness and speed of manufacture, I prefer to produce the device in the manner hereinbefore described.

In Fig. 6, I have shown a differently shaped device 2' of triangular form, provided with the cut-out portions 12' and prongs 14', a wire handle 16' being provided as before.

If desired, the wire 16 may be omitted entirely, or two such wires, associated with the container 2 in any manner preferred, may be provided. Such a modification is shown in Fig. 7, in which the container 2'' is provided with projections 14'' and wires 16'', extended from each side.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. A device of the character dscribed comprising a pair of concave plates peripherally conjoined to form a closed receptacle, each of said plates having a plurality of outwardly directed upstanding accuminate members bent therefrom and said plates being provided with a plurality of openings communicating with the interior of the receptacle, and a handle having a portion thereof extended through and permanently conjoined with said plates.

1. A device of the character described comprising a pair of concave plates connected together to form a closed receptacle, a plurality of outwardly directed barbs associated with said device, juxtaposed to openings in said plates, said device being adapted to house a poison accessible to insects through said openings, a handle extending through said device, and means on said handle contacting said plates to prevent the removal of said handle from said device.

In testimony whereof I have signed my name to this specification.

JOHN S. DAVIS.